United States Patent [19]

Van Driessche

[11] 4,066,370

[45] Jan. 3, 1978

[54] ASSEMBLING PIECE

[76] Inventor: Paul Van Driessche, 88 Chemin de Thieusies, 7400 Soignies, Belgium

[21] Appl. No.: 686,985

[22] Filed: May 17, 1976

[30] Foreign Application Priority Data

May 16, 1975 Belgium .................................. 156437

[51] Int. Cl.² .............................................. F16B 5/00
[52] U.S. Cl. .................................... 403/217; 403/231; 52/285
[58] Field of Search ............... 403/169, 170, 171, 172, 403/176, 217, 218, 219, 205, 401, 402, 406, 231, 65; 52/758 H, 656, 475, 285

[56] References Cited

U.S. PATENT DOCUMENTS

| 269,907 | 1/1883 | Worrall | 403/402 |
| 1,398,695 | 11/1921 | Hull | 403/263 X |
| 3,386,590 | 6/1968 | Gretz | 403/172 X |

FOREIGN PATENT DOCUMENTS

| 850,462 | 9/1939 | France | 403/402 |

Primary Examiner—Wayne L. Shedd
Attorney, Agent, or Firm—Sughrue, Rothwell, Mion, Zinn and Macpeak

[57] ABSTRACT

An assembling piece which is easy to manufacture, each piece comprising two intersecting vertical walls, said walls being disposed at right angles to the each other and joined by a common horizontal wall. The exterior surfaces of said vertical walls comprise a protruding flange for cooperation with a horizontal element.

8 Claims, 5 Drawing Figures

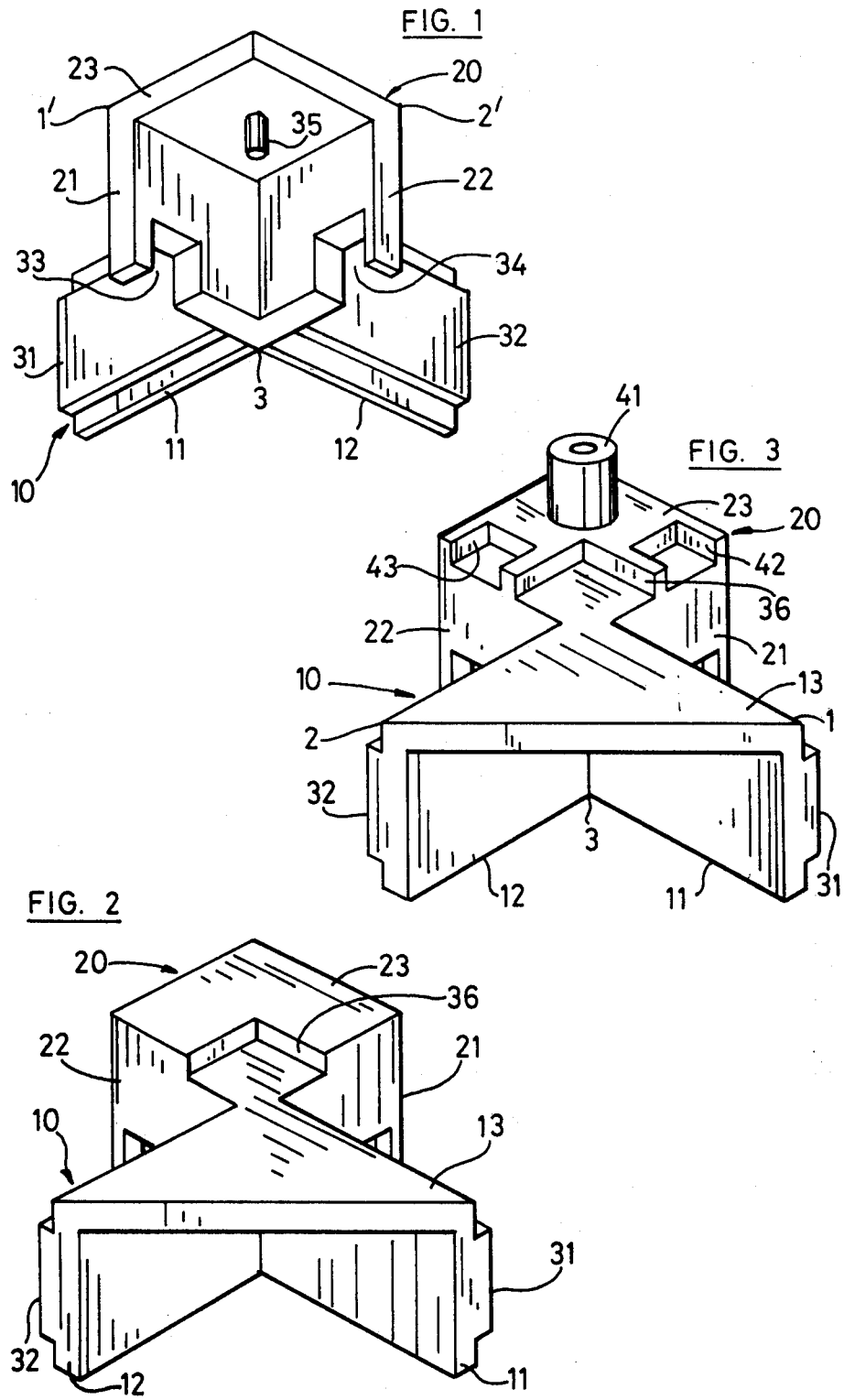

ASSEMBLING PIECE

The present invention relates to an assembling piece for assembling in a stable and removably manner vertical and horizontal elements and particularly elements intended to form pieces of furniture, book-cases, or similar.

Two major problems are encountered with the assembling of elements intended to form pieces of furniture and shelves of various kinds. The first of these problems is to realize a simple and stable assemblage of the upright elements. Often, this assemblage would preferably be removable in order to permit the easy disassembling of said elements, whenever needed. The second of said problems is to obtain a rigid support for the horizontal elements. Usually, these two problems are solved through using distinct means. But, for the sake of greater standardization of the furniture making, it would be more advantageous to have at one's disposal one sole means, adapted to be used simultaneously as fixing means for the upright elements and as supporting means for the horizontal elements.

The present invention relates to a novel assembling piece solving simultaneously the two problems indicated above.

According to the invention, there is provided a piece substantially comprising two intersecting vertical walls, each of said walls being disposed at right angles to each other and having common plane edges and a third wall lying in a horizontal plane, and joining the vertical walls along said common plane edges. The exterior surfaces of said vertical sections of one of said two parts comprise a protruding flange forming interfitting means for cooperation with a horizontal element.

The lower surface of the horizontal wall is provided with a vertical tenon adapted for cooperation with a vertical element. The upper surface of the horizontal wall of the assembling piece of the invention is stepped at a higher level than the remainder of the upper surface of the horizontal wall, and that upper surface portion is provided with a horizontal V-shaped notch in its corner situated near the intersection of the vertical walls.

The exterior surface of the horizontal wall, situated at a higher level, may further comprise a locking means for cooperation with a vertical element, said locking means comprising, for instance, a vertically projecting member on the stepped surface portion of said horizontal wall.

BRIEF DESCRIPTION OF THE DRAWINGS

FIGS. 1 and 2 are perspective views of a preferred embodiment of an assembling piece in accordance with the invention, FIG. 3 is a perspective view of a modified embodiment of the assembling piece of FIGS. 1 and 2, FIGS. 4 and 5 are perspective views illustrating an assemblage realized with the use of an assembling piece in accordance with the invention.

DETAILED DESCRIPTION

Figure 4:
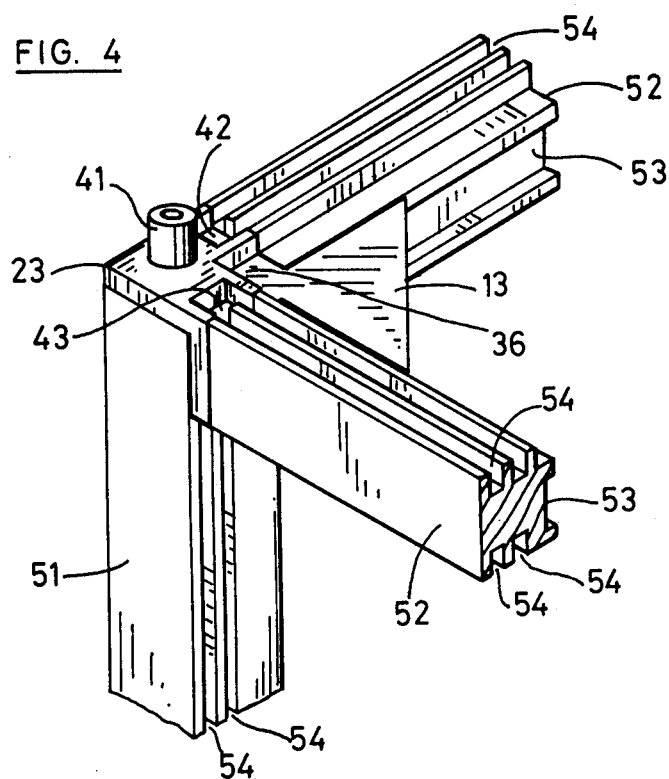

Referring to FIGS. 1, 2 and 3, it can be seen that the assembling piece according to the invention comprises two parts 10 and 20, each of which being shaped so as to form three sections 11, 12, 13, and 21, 22, 23 respectively, each disposed at right angles to the adjacent sections and each having a common edge with each of the other two sections: section 13 has common edge 1 with section 11 and common edge 2 with section 12; section 11 has common edge 1 with section 13 and common edge 3 with section 12. Similarly, the sections 21, 22 and 23 have common edges 1', 2' and 3', respectively, and the parts 10 and 20 have a common edge 3. Sections 11 and 22 form a first vertical wall which intersects a second vertical wall formed by sections 21 and 12, the walls intersecting each other at right angles and defining for a portion of the piece, a cruciform. Further, sections 23 and 13 which are integral with the vertical wall form a common horizontal wall which extends to opposite sides of the cruciform or intersection of the vertical walls. Further, for each embodiment, section 23 constitutes a stepped upper surface for the common horizontal wall.

Two sections of each part, i.e. the sections 11 and 12 of part 10, and the sections 21 and 22 of part 20, are lying in vertical planes; the third sections, i.e. section 13 and section 23, respectively, extend in a horizontal plane. It is further apparent that the sections of part 10 are prolonging the corresponding sections of part 20.

The exterior surfaces of the two vertical sections 11 and 12 of part 10 are provided with longitudinal protruding flanges, 31 and 32 respectively, which are parallel to the plane of section 13 and are adapted to cooperate with a horizontal element, the flanges 31 and 32 forming first means for interfitting the pieces to the ends of horizontal frame elements 52 and 53. Each of the vertical sections 21 and 22 of part 20 is provided with a notch 33 and 34 respectively.

The lower surface of the horizontal section 23 is provided with a vertical tenon 35 which constitutes a locking means for a vetical frame element. Tenon 35 comprises a second means for interlocking the piece to the upper end of a vertical frame element 51. The upper surface of said horizontal section 23 is further situated at a higher level than the plane of the upper surface of the horizontal section 13, and is provided with a horizontal V-shaped notch 36 in its corner situated near the first part 10.

The above described embodiment A of an assembling piece according to the invention is intended to be used at the upper level of a piece of furniture or a similar structure.

FIG. 3 illustrates a modified embodiment B of an assembling piece in accordance with the invention. The modification consists in providing the upper surface of the horizontal section 23 with the following three elements:

a. a vertically protruding member 41 which is advantageously coaxial with the vertical tenon 35;

b. two horizontal notches 42 and 43 which are perpendicular to the planes of the vertical sections 21 and 22.

This embodiment B is intended to be used at the intermediate levels of a piece of furniture or a similar structure.

Figure 5:
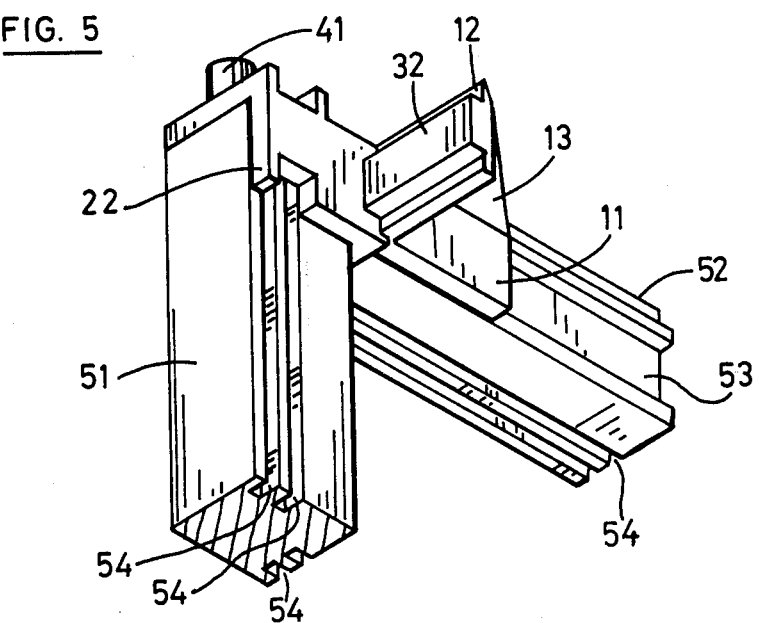

The FIGS. 4 and 5 illustrate the use of the assembling pieces A and B for the assembling piece of furniture or a similar structure.

Vertical frame elements such as uprights are formed with an appropriately shaped upper end adapted to mate with into the space defined by the sections 21, 22 and 23 of an assembling piece according to the invention, and to house the vertical tenon 35. The lower end of said vertical elements is so shaped as to mate onto the vertical protruding member 41 on the upper surface of the horizontal section 23. Member 41 comprises a third means for interlocking a piece to the lower end of a vertical frame element 51. Horizontal frame elements such as 52 are provided with grooves such as 53, which allow the projecting flanges 31 and 32 formed on the outer surfaces of the vertical sections 11 and 12 to be inserted therein. In this way, an assembling piece according to the invention permits to assemble simultaneously vertical and horizontal elements at each of the four corners of the structure to be realized.

The upper surface of each horizontal section 13 forms the supporting surface for one corner of a horizontal shelf, which in fact is housed in one of the horizontal notches 36. The assembling then proceeds as described above for the successive levels; at the top level, however, four assembling pieces of type A (FIGS. 1 and 2) are to be used, with the four corners of the upper horizontal plate being inserted into the horizontal notches 36.

The vertical and horizontal frame elements are provided with longitudinal grooves 54 adapted to secure the side-panels, the rear panel and sliding front-panels. For this purpose the vertical sections 21 and 22 of an assembling piece according to the invention are advantageously provided with vertical grooves 33 and 34, and the upper surface of the horizontal section 23 of the embodiment B (FIG. 3) is advantageously provided with two horizontal grooves 42 and 43 extending perpendicularly to the planes of the vertical sections 21 and 22 respectively.

The assembling piece according to the invention may be manufactured in a great number of materials: advantageously, it may be made of moulded plastic.

The above description relates to exemplary embodiments of the assembling piece according to the invention; variations can be made by those skilled in the art without departing from the scope of the present invention.

What is claimed is:

1. An assembling piece for forming a corner joint for a modular furntiure structure, said piece comprising:
   two right angle, intersecting vertical walls of cruciform configuration,
   a horizontal wall integral with said vertical walls and extending on both sides of said intersection and at right angles thereto,
   said vertical walls including first means for mechanically interfitting said piece with the ends of horizontal frame elements coupled to respective vertical walls and extending parallel thereto and at right angles to each other,
   said intersecting vertical walls and said horizontal wall defining a corner cavity on one side of said cruciform for receiving the upper end of a vertical frame element, and
   at least one of said walls at said cavity carrying a second means for mechanically interlocking the piece with the end of said vertical frame element for locking said frame element to said piece,
   and wherein said horizontal wall constitutes a rigid mechanical reinforcement for said piece,
   and wherein that portion of the wall which extends on the opposite side of said cruciform forms an integral support for horizontal shelving or the like.

2. The assembling piece of claim 1, wherein the outer surfaces of the vertical walls are provided with a protruding flange, said flange forming said first means and being recievable within a groove within a horizontal frame element.

3. The assembling piece of claim 1, wherein the lower surface of the horizontal wall is provided with a vertical tenon, said tenon forming said second, interlocking means.

4. The assembling piece of claim 1, wherein the upper surface of the horizontal wall is stepped to a higher level to one side of the cruciform and said stepped upper surface portion is provided with a horizontal V-shaped notch which opens toward the intersection of the vertical walls.

5. The assembling piece of claim 1, wherein the upper surface of the stepped portion of the horizontal wall is provided with a third means for forming an interlocking connection with a vertical frame element which projects upwardly therefrom.

6. The assembling piece of claim 5, wherein said third means comprises a vertically projecting member.

7. The assembling piece of claim 1, wherein each vertical wall is provided with a vertical groove for permitting passage of a vertical panel edge.

8. The assembling piece of claim 1, wherein the upper surface of the horizontal wall stepped portion is provided with horizontal grooves, said grooves acting to receive the lower ends of vertical panels.

* * * * *